United States Patent [19]

Cary et al.

[11] Patent Number: 4,875,159
[45] Date of Patent: Oct. 17, 1989

[54] VERSION MANAGEMENT SYSTEM USING PLURAL CONTROL FIELDS FOR SYNCHRONIZING TWO VERSIONS OF FILES IN A MULTIPROCESSOR SYSTEM

[75] Inventors: Richard W. Cary, Los Gatos; Richard D. Guyon, Mountain View, both of Calif.

[73] Assignee: Amdahl Corporation, Sunnyvale, Calif.

[21] Appl. No.: 136,859

[22] Filed: Dec. 22, 1987

[51] Int. Cl.[4] .................. G06F 13/42; G06F 9/46; G06F 15/16; G06F 15/40
[52] U.S. Cl. .................. 364/200; 364/271.3; 364/269; 364/271; 364/260.8
[58] Field of Search ... 364/200 MS File, 900 MS File

[56] References Cited
U.S. PATENT DOCUMENTS

| | | | |
|---|---|---|---|
| 3,653,001 | 3/1972 | Ninke | 364/200 |
| 3,703,708 | 11/1972 | Foster | 364/200 |
| 4,408,273 | 10/1983 | Plow | 364/200 |
| 4,410,942 | 10/1983 | Milligan | 364/200 |
| 4,451,901 | 5/1984 | Wolfe et al. | 364/900 |
| 4,564,903 | 1/1986 | Guyette | 364/200 |
| 4,627,019 | 12/1986 | Ng | 364/900 |
| 4,751,672 | 6/1988 | Yamada | 364/900 |
| 4,805,090 | 2/1989 | Coogan | 364/200 |

Primary Examiner—Archie E. Williams, Jr.
Assistant Examiner—Eric Coleman
Attorney, Agent, or Firm—Fliesler, Dubb, Meyer & Lovejoy

[57] ABSTRACT

In a data processing system that stores a first and second version of a given data set, a method for synchronizing the first and second versions comprises steps of maintaining a sync-complete control field and a sync-in-progress control field in the inode of each of the first and second versions. Write accesses to the versions are modified so that the sync-complete control field and the sync-in-progress control field are cleared in response to any change in the associated version. The sync-complete control bits for the first and second versions are tested, and if either or both are cleared, then the sync-in-progress control field associated with a select source version is set. Next, a copy of the source version is transferred to a temporary file. After the transfer is complete, the sync-in-progress control field in the source version is tested, and if it is set when the temporary version is complete, then the sync-complete control field is set and the sync-in-progress control field is cleared in the source versions. Next, the sync-complete control field is set in the temporary version. Finally, the temporary version is renamed to the other of the first and second versions and the original other version is removed.

25 Claims, 4 Drawing Sheets

VERSION MANAGEMENT SYSTEM USING PLURAL CONTROL FIELDS FOR SYNCHRONIZING TWO VERSIONS OF FILES IN A MULTIPROCESSOR SYSTEM

LIMITED COPYRIGHT WAIVER

A portion of this patent document contains material to which a claim of copyright protection is made. The copyright owner has no objection to the facsimile reproduction by anyone of the patent document, or the patent disclosure as it appears in the U.S. Patent and Trademark Office patent file records, but reserves all other rights whatsoever.

CROSS-REFERENCE TO RELATED APPLICATION

The present application is related to copending U.S. Patent Application entitled CROSS-COUPLING OF SERVICE PROCESSOR DRIVEN SYSTEM CONTROL FACILITIES IN A MULTIPLE SERVICE PROCESSOR DATA PROCESSING SYSTEM; invented by Eddie "B" Collins Jr. et al.; Ser. No. 07/136,906; filed Dec. 23, 1987. The related application was owned at the time of invention and is currently owned by the same assignee as the present invention. It is incorporated by reference as is fully set forth herein.

BACKGROUND OF THE INVENTION

1. Field of the Invention

The present invention relates to a mechanism for keeping files synchronized in a multiple processor system that maintains more than one version of a given file.

2. Description of Related Art

In a data processing system which includes multiple service processors, each of which maintains its own version of a pre-specified plurality of data sets, it is necessary to keep those versions synchronized in order to facilitate a consistent handling of the resources of the data processing system in the event of transfer of control from one of the service processors to another. For the purposes of this application, the term "synchronized" means that versions of a given data set residing on different storage media in a data processing system, have identical contents.

In a system maintaining more than one version of a given data set, the requirement to keep data sets synchronized places the following burdens on the synchronizing system:

1. recognition that the versions of the data set are not the same;
2. selection of which version will be used as a master for the synchronizing process;
3. transfer of data from a designated source version to its counterpart target version in the other storage medium;
4. replacement of the target version in a way that maintains the integrity of the file in an environment in which the source and target versions may be changing;
5. prevention of loss of data which may occur because of disruption while a file synchronizing operation is in progress.

A prior art system in which file synchronization may be accomplished is exemplified by the UNIX operating system developed by AT&T, Bell Laboratories. Using UNIX, one could recognize that files are not synchronized by coding a synchronization status using existing file protection bits located in the UNIX inode. However, use of these file protection bits would have the following problems:

1. use of the protection bits for file protection, their intended purpose, would be restricted for files which must be kept synchronized;
2. the protection bits, if used for the dual purpose of recording file synchronization status and for file protection, would have to be manipulated by every application program which modifies the contents of the files;
3. when changing the status of a file from "not synchronized" to "synchronized," there is a critical section of the process during which a higher priority process could be scheduled to run. If this higher priority process modifies the contents of the file, and then marks the file status as "not synchronized," the file status will be incorrectly overwritten when the lower priority process resumes execution and marks the file status as "synchronized."

As an alternative, a separate synchronization record file could be maintained, with the obvious pitfall that the actual file status could be modified without updating the record file if system operations are interrupted by a machine fault or other operator action.

In the UNIX operating system, there is no mechanism to replace one file with another in a way which guarantees that the file contents will not be lost if the operation is interrupted. Therefore, the fourth burden on the synchronization algorithm cannot be safely overcome.

The usual method for replacing files in operating systems with UNIX system calls is to:

1. UNLINK the target file name, having the effect of deleting the file name such that no application program will have access to the file;
2. LINK the target file name to the replacement file. After this operation, the contents of the replacement file can be accessed by using either the target file name or the replacement file name. Only one data set exists, but it is accessible with both names.
3. UNLINK the replacement file name. This operation removes the extra name for the file, such that the data set is now only accessible by the original target file name.

It is apparent that this mechanism is insufficient because there is a window during which a processor outage could leave the system without a critical system file. After the first UNLINK step but before the LINK has completed, the system has no access to the target file because the old version has been deleted and the replacement version has yet to be renamed to the target filename.

SUMMARY OF THE INVENTION

The present invention provides method and apparatus for satisfying all five burdens on a synchronization algorithm. Accordingly, in a data processing system that stores a first and second version of a given data set, a method for synchronizing the first and second versions is provided. The method comprises steps of maintaining a sync-complete control field and a sync-in-progress control field in association with each of the first and second versions. For systems maintaining only two versions, the sync-complete and sync-in-progress control fields are one bit in size, but may be extended for systems maintaining more than two versions. When the sync-complete control field is set, it indicates that the associated version is synchronized. When the sync-in-progress control field is set, it indicates that the associated version is in the process of being synchronized. Further, the write accesses to the versions are modified so that the sync-complete control field and the sync-in-progress control field are cleared in response to any change in the associated version.

The method according to the present invention operates by detecting the sync-complete control field for the first and second versions, and if either or both are cleared, then setting the sync-in-progress control field associated with one of the first and second versions. Next, a copy of the one version is transferred to a temporary file in order to establish a temporary version of the data set. After the transfer is complete, the sync-in-progress control field in the one version is detected, and if it is set when the temporary version is complete, then the sync-complete control field is set and the sync-in-progress control field is cleared in the one version. Next, the sync-complete control field is set in the temporary version. Finally, the temporary version is re-named to the other of the first and second versions and the original other version is removed.

According to one aspect of the invention, the step of detecting the sync-complete control field for the first and second versions, and if either or both are cleared, then setting the sync-in-progress control field associated with one of the first and second versions, is uninterruptible. Also, the step of renaming the temporary version to the other of the first and second versions and removing the original other version, is uninterruptible.

According to another aspect of the invention, the mechanism is an apparatus for accomplishing the functions necessary to synchronize the file as summarized with respect to the method aspect of the invention.

In a UNIX operating system maintaining two versions of a set of fields, the present invention is implemented by providing an extension of the definition of a file inode to include two user-modifiable status bits, referred to as the sync-in-progress (SIP) control bit and the sync-complete (SC) control bit, as mentioned above. The file write operations are modified to clear both of the control bits whenever an application program writes to an associated file. Further, a new operating system call to change these control bits with a compare and swap type operation is specified, called "chflag (filename, new value, check value)." The file synchronization status bits are only modified if the current value of the status bits matches the check value. In addition, a new operating system call to replace a file in an uninterruptible fashion is provided, called "replace file (source filename, target filename)." This system call is designed such that the existence and integrity of the target file are guaranteed even if the replace operation fails, such as due to interruption in processor operations.

DESCRIPTION OF THE PREFERRED EMBODIMENT

The detailed description of the preferred embodiment of the present invention is provided with reference to FIGS. 1-5.

Figure 1:
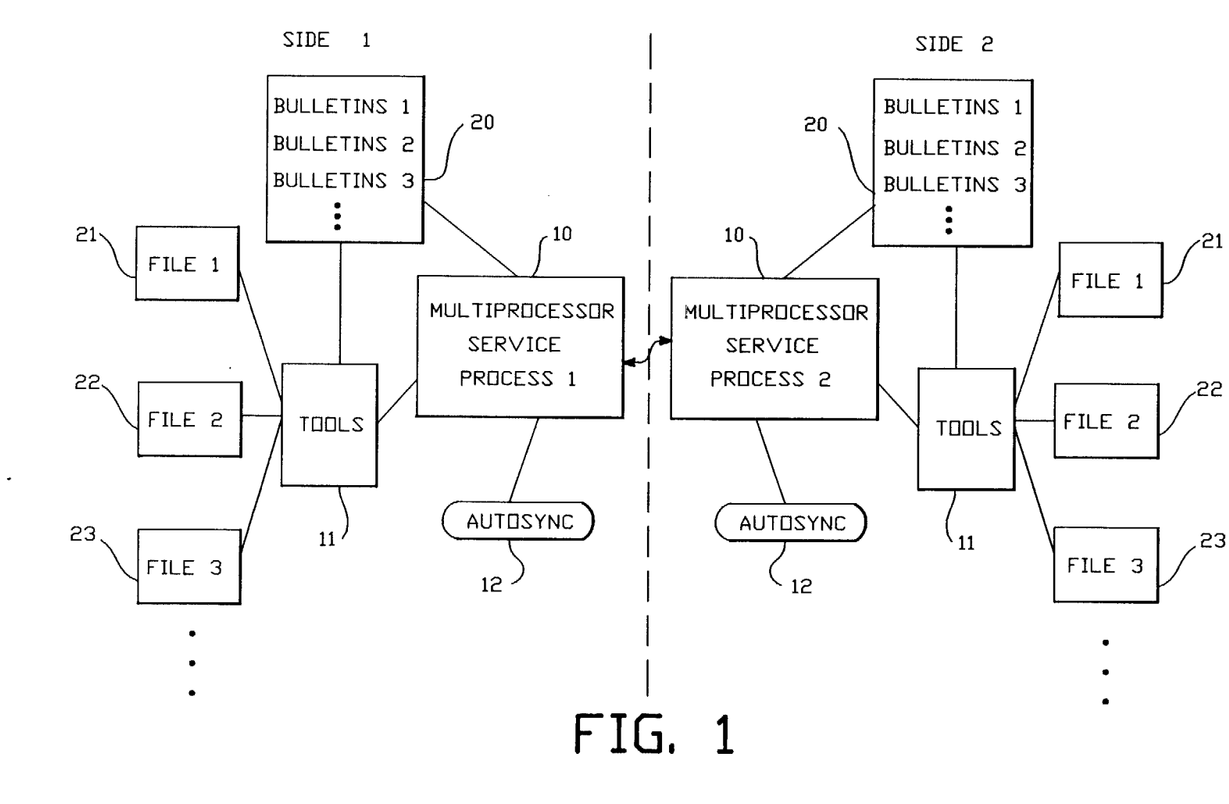
FIG. 1 is a conceptual block diagram of the mechanism according to the present invention.
Figures 2, 3:
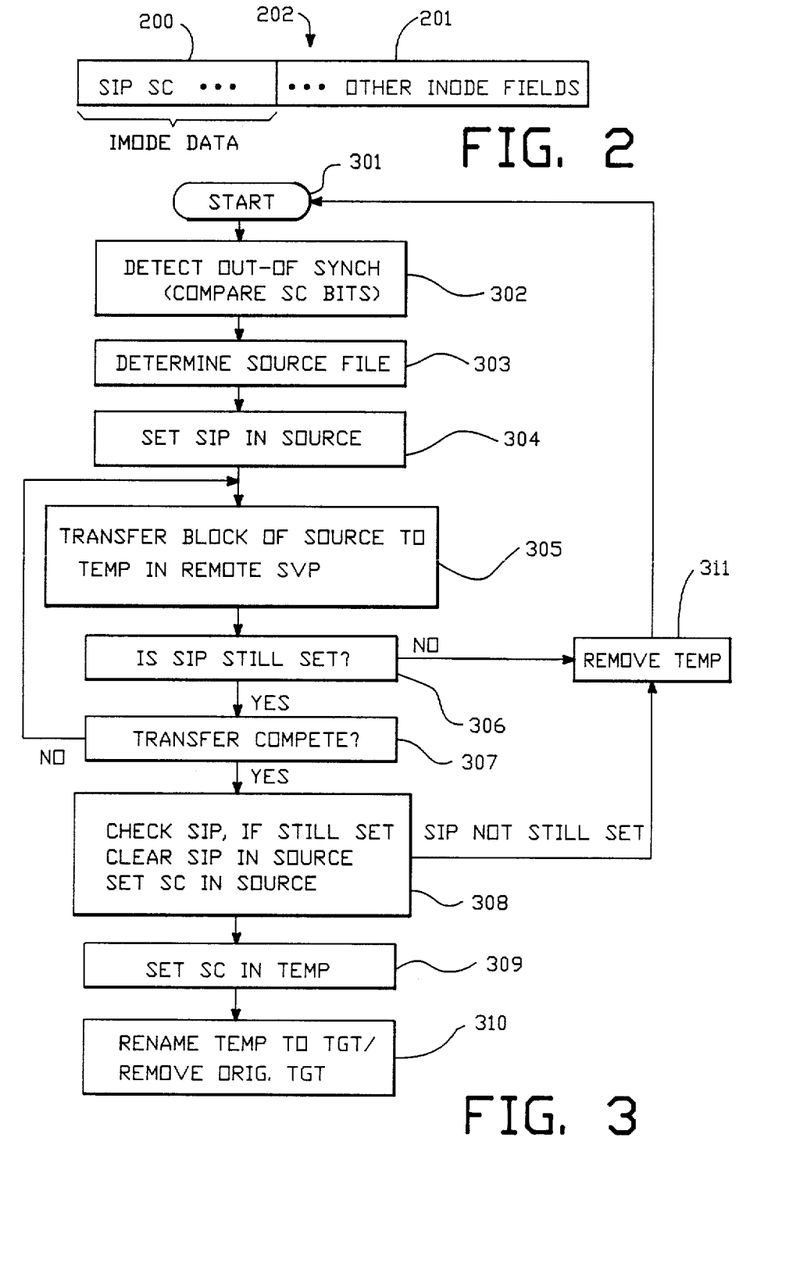
FIG. 2 is a diagram of the modified file inode according to the present invention.
FIG. 3 is a flowchart of the synchronization algorithm according to the present invention.
Figure 4:
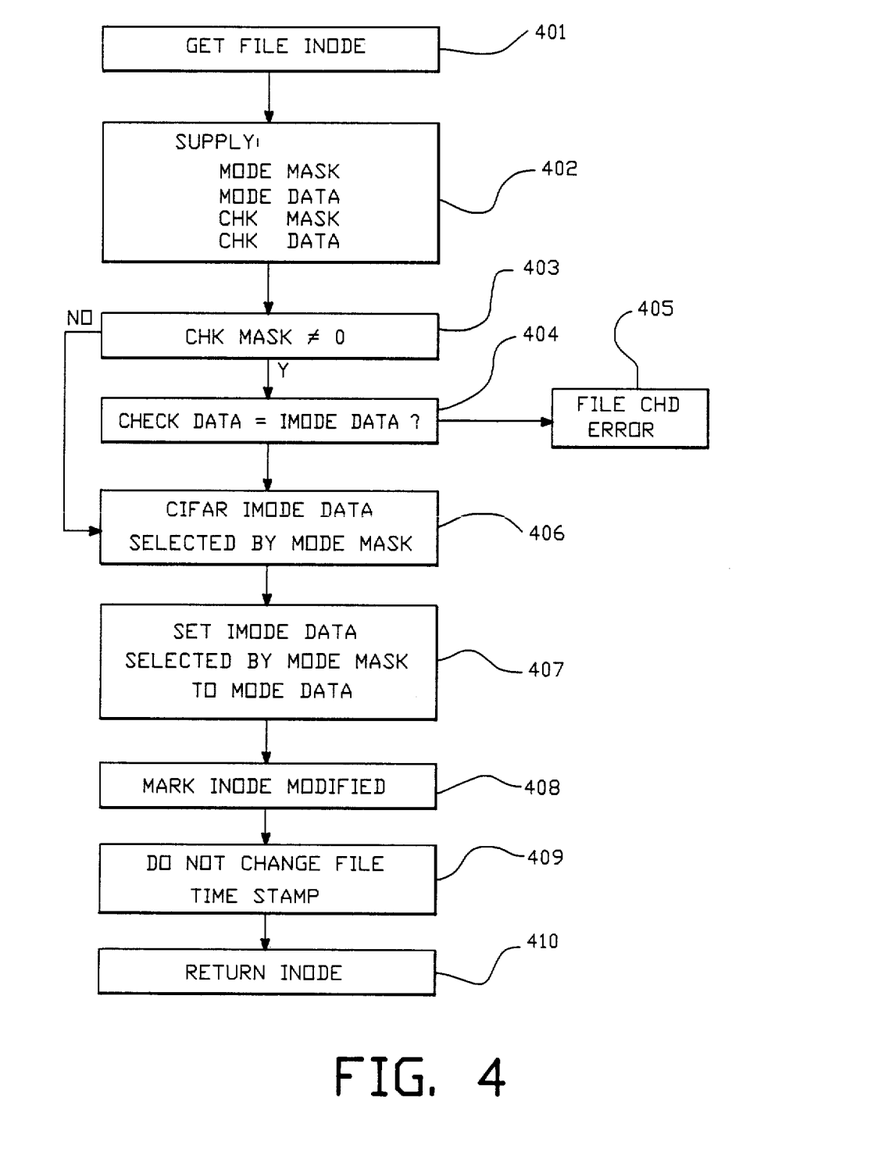
FIG. 4 is a flowchart of the change flag system call according to the present invention.
Figure 5:
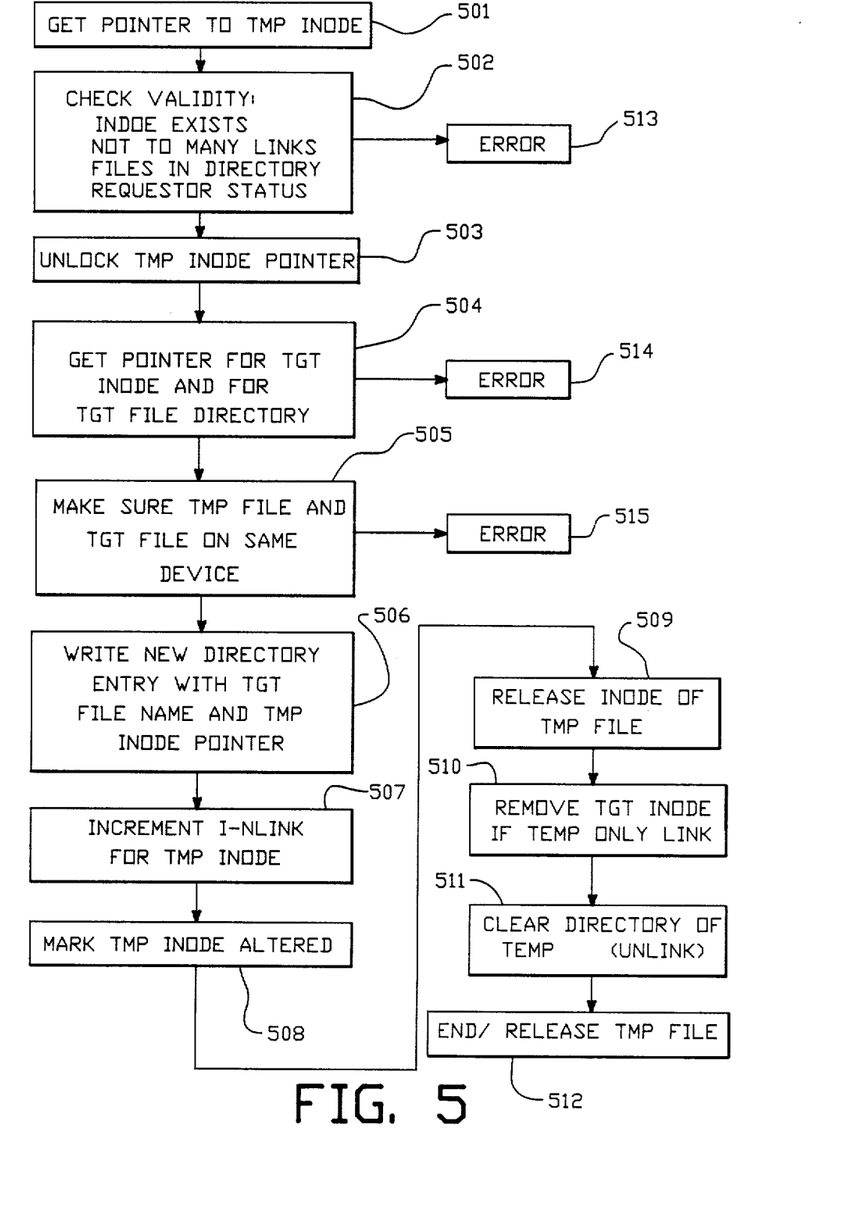
FIG. 5 is a flowchart of the replace file system call according to the present invention.

The preferred embodiment is implemented in a data processing system that includes multiple service processors such as that described in the above cross-reference to U.S. Patent application entitled CROSS-COUPLING OF SERVICE PROCESSOR DRIVEN SYSTEM CONTROL FACILITIES IN A MULTIPLE SERVICE PROCESSOR DATA PROCESSING SYSTEM. In this system, the service processor is run in a modified UNIX operating system environment that can be schematically characterized for the purposes of this invention as shown in FIG. 1. FIG. 2 illustrates the modification of the inode field to add the sync-complete and sync-in-progress control fields. FIGS. 3-5 illustrate the synchronizing process according to the present invention, and the change flag system call and the replace file system call used in the synchronizing process, respectively.

As schematically illustrated in FIG. 1, the dual service processor system includes side 1 and side 2 which consist of independent UNIX-based operating systems. Each side includes its own storage facility that maintains a plurality of files in a tree-structured classification system. Each file is identified by an index node, called inode in the UNIX system, that includes a mode field.

Each side includes the following:

A process 10 that provides the communication between service processors known as the multiprocessor service process (MPSP).

A plurality 21, 22, 23 of pre-specified control file groups F1, F2, F3 in its respective storage facility. Each group may have a number of control files.

A set 20 of bulletins B1, B2, B3 (one per control file group) that contains a time stamp of the last time that group of control files was changed.

A set of tools 11 that modify the control files and which updates the appropriate bulletins with the current timestamp at the time of the modification.

In the preferred embodiment, one side (the secondary side) has fewer tasks than the primary side and is given the responsibility of maintaining the file system in a synchronized state. On this side the MPSP periodically fetches the bulletins from the primary side and compares them to those on the secondary side. If any bulletins differ, the MPSP on the secondary side starts another process 12 (known as the AUTOSYNC process) which has the responsibility of synchronizing any files that have changed.

The AUTOSYNC process embodies the knowledge of which files belong in each group of control files. When it detects that a pair of bulletins for a particular group differ, it requests the MPSP process to synchronize each member of that group. The MPSP process determines which of the requested files need synchronizing and implements the process. After completing the synchronization of the entire group of files, the local bulletin for the gruop is checked to see if it has changed since it was first determined that synchronization was required. If it has changed, the synchronizing process is restarted for the group. If it has not changed, the local bulletin is set to the value the remote bulletin had when it was first determined that synchronization was needed. If the remote bulletin has changed since that time, it will be detected by the MPSP process and the AUTOSYNC process will be re-invoked. This procedure is known as background synchronization.

In addition to the background synchronization described above, the AUTOSYNC process is also run just prior to each time when the system needs both sets of files synchronized, such as initial program load and join operations. In these instances all files are checked to ensure complete synchronization. (Incomplete synchronization could occur if any files had been changed by non-standard tools that did not set the bulletins, or if the synchronizing process was incomplete at the time when completion was needed.) This is known as foreground synchronization.

The purpose of the background synchronization is to minimize the amount of file transferring required to complete the foreground synchronization, by doing the synchronizing as soon as possible after the need arises, and to ensure that all changes are migrated to the backup service processor for standby operations during a failure of the primary service processor.

The status of the sync-complete control bit is determined by accessing the file inode for the files listed after review of the bulletins. The file 202 is a field of data as shown in FIG. 2. The inode includes a mode field 200, termed IMODE DATA, that includes a plurality of protection bits and mode information for the file identified in the other inode fields 201. According to the present invention, the mode field is extended by adding the sync-in-progress SIP control bit and the sync-complete SC control bit. In addition, the operating system is modified so that all write accesses to the pre-specified files clear the SIP and the SC control bits in the file inode.

Once the synchronizing operation 12 determines that one of the pre-specified files must be synchronized, the functions illustrated in FIG. 3 are carried out. The process of synchronizing files as illustrated in FIG. 3, starts when the background process determines that one of the pre-specified files has been accessed since the last synchronization process by a review of the primary bulletin (block 301). For such a file, the synchronization process detects files that are out of synchronization (block 302). This is done by checking the mode field of the inode to determine whether either the primary or secondary version of the file has the sync-complete bit cleared.

If the file needs synchronizing, a source file is determined by the state of the file status bit. The algorithm for determining which file should be used as the source is very much dependent on the needs of the user. In the preferred implementation, the source file is defined as the one that has been modified, i.e., the one with a cleared sync-complete control bit. If both files have been modified, the pre-designated primary version is used as the source. The user may wish to use other processes for determining the source, such as reliance on time stamps, or defining a pre-designated side always to be the source (block 303).

Next, the sync-in-progress control bit is set in the inode of the source file (block 304). Then the source file is transferred to the storage facility in the target service processing system. This occurs by transferring a block of the source to a temporary file in the remote service processor (block 305). Then, the sync-in-progress bit is checked in the source file inode (block 306). If the sync-in-progress is still set, it is determined whether the complete source file has been transferred (block 307) and if not, the algorithm loops to block 305 to transfer another block of the source file.

If the sync-in-progress is not set in the test of block 306, the temporary file is removed from the target service processor and the source file must be re-transferred (block 311). After the temporary file is removed in block 311, the algorithm loops to the start block 301.

After the transfer of the source file to the temporary file is complete, as determined in block 307, an uninterruptible process is called which, if the SIP is still set, clears the sync-in-progress bit and sets the sync-complete bit in the source inode (block 308). Then, the sync-complete bit is set in the temporary file inode (block 309). Finally, the temporary file is renamed to the target and the original target file is removed (block 310).

The process of block 308 in which the SIP control bit and the SC control bit in the source inode file are modified, is carried out using the change flag system call as shown in FIG. 4. This system call is uninterruptible and is only called if the SIP control bit is still set after the final block of the source file has been transferred. This ensures that the source file has not been modified after the transfer has begun. If the source file has been modified, then it must be re-transferred through block 311 as mentioned above.

The process of block 310 in which the temporary file is renamed to the target and the original target file is removed, is carried out in the uninterruptible replace file system call which is illustrated in FIG. 5.

FIG. 4 is a flowchart of the change flag CHFLAG system call. A copy of source code of CHFLAG is provided following the text of this application. The change flag system call operates with a compare and swap-type operation and is used for all accesses that modify or check the control bits, i.e., blocks 302, 304, 306, 308 and 309. During operation of the change flag system call, the service processor is placed in the supervisor mode which disables all interrupts and makes the process uninterruptible.

The function begins by getting the file inode (block 401). The user supplies a mode mask in the system call which identifies the bits in the mode field to be accessed, mode data which is the value of the control bits to be written, a check mask which identifies the bits in the mode field IMODE that are to be compared with the check data, and the check data which is the expected value of the control bits in the mode field identified by the check mask (block 402). If the check mask is not equal to zero as determined in block 403, the check data is compared to the IMODE data selected by the check mask to determine whether it has its expected value (block 404). If it is not equal to the expected value, a file-changed error is signaled (block 405). If the IMODE data has the expected value or if the check mask is equal to zero from block 403,, the IMODE data identified by the mode mask is cleared (block 406). Next, the IMODE data is set to the value specified by the mode data field supplied in the system call (block 407). Next, the inode is marked modified according to standard UNIX practice (block 408). Then, a flag is set that prevents updating the time stamp in the inode for the file (block 409). Finally, the inode is returned with the value of the control bits determined or modified as specified during the system call (block 410).

FIG. 5 illustrates the replace file REPLACEFILE system call according to the present invention. Source code of REPLACEFILE is provided following the text of this application. As illustrated in FIG. 5, the function begins by getting the pointer to the temporary file inode (block 501). The temporary file inode pointer is designated the FIP, for "from inode pointer," indicating that the file will be renamed from the temporary to the target.

Next, the algorithm checks the validity of the temporary inode, including determining whether the inode exists, whether the number of links to the inode exceeds the maximum, whether the temporary file is in a directory and whether the status of the requestor is valid (block 502). If the validity of the temporary file checks out, the inode pointer to the temporary file is unlocked (block 503). Next, a pointer for the target inode and for the target file directory are returned (block 504). The target INODE pointer is designated TIP, indicating that the temporary inode will be renamed to the target. Next, the process makes sure that the file pointed to by the temporary inode and the target file, reside on the same logical device (block 505). This implements a standard UNIX rule that files in different disks cannot be linked.

If both files reside on the same logical device, or if the target file does not exist, a new directory entry is created with the target file name and the inode pointer for the temporary file (block 506). Next, the number of links in the inode for the temporary file is incremented by increasing the I-NLINK field of the inode (block 507). Next, the inode for the temporary file is marked as altered (block 508). Next, the inode of the temporary file is released (block 509). After release of the inode of the temporary file, the new directory entry and the temporary directory entry both point to the inode of the temporary file.

Then, if the old target file existed, the number of links to it is decremented. If the old target file directory entry was the only link to the file, the inode for the file will be released at this time (block 510). Finally, the directory is cleared of the temporary file inode pointer by an UNLINK process (block 511). Lastly, the algorithm ends and the file pointed to by the temporary file inode is released (block 512).

Error conditions are signaled if the validity check in block 502 is not successful (block 513), if the pointers for the target inode and for the target file directory cannot be returned (block 514), or if the 'from' file and the 'to' file are not on the same device (block 515).

The replace file operation is uninterruptible. This is accomplished by causing the system call to change the status of the processor to supervisor mode in which all interrupts are disabled. It will be seen that according to the replace file system call, the target file will always exist in either its original form or as a copy of the source file (called the temporary file). Further, the process of removing the old target file and replacing it with the temporary target file is uninterruptible.

CONCLUSION

The present invention provides an efficient means for satisfying the burdens 1, 2, 4, and 5 discussed in the Background of the Invention. It combines a mechanism for marking files when they are altered with an optimization mechanism for quickly identifying recently changed files when both of the service processors are fully operational. Replacement of old data with new data without jeopardizing the integrity of the file contents, is addressed using service functions which cannot create a file corrupted by modifications made concurrently with the synchronizing operation, nor a situation in which an essential system file is nonexistent because of an interrupted transition in the synchronization operation (for example, by system failure of one of the service processors).

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the accompanying claims and their equivalents.

---

SUBMISSION OF COMPUTER PROGRAM LISTINGS
UNDER 37 C.F.R. §1.96(a)(2)(i)
CHFLAG
Copyright 1987, Amdahl Corporation

```
1  chflag( )
2  {
3    register struct inode *ip;
4    register unsigned int mode__mask, mode__data;
5    register unsigned int chk__mask, chk__data;
6
7    if ( (ip = namei(&uchar, 0)) = = NULL ) /* Get ptr to file' inode */
8      return;
9
10
11   /* the legal bits to modify are a subset of the mode bits */
12   mode__mask = u—>u__arg[1] & IUSER__FLAGS__MASK;
13   mode__data = u—>u__arg[2] & mode__mask;
14   chk__mask = u—>u__arg[3] & IUSER__FLAGS__MASK;
15   chk__data = u—>u__arg[4] & chk__mask;
16
17   /* If user has supplied a status info buffer, then compare to */
18   /* current status info and return error code if file has changed */
19   if(chk__mask != 0) {
20     if((ip—>i__mode & chk__mask) != chk__data) {
21       seterror(EFILECHGD);
22       goto chflag__end;
23     }
24   }
```

```
25
26  /* clear the bits which are going to be written by this call */
27  ip->i_mode &=  mode_mask;
28
29  /* merge the bit values from the caller */
30  ip->i_mode |= mode_data;
31
32  ip->i_flag |= IUPD; /* Mark the inode as modified. */
33
34  /*
35   * Set a flag that prevents updating the time
36   */
37  ip->i_chtime = -1;
38
39  chflag_end:
40  iput(ip);
41  }
```

REPLACEFILE
Copyright 1987, Amdahl Corporation

```
 1  replacefile( )
 2  {
 3  register struct inode *fip; /* The 'from' file's inode ptr */
 4  register struct inode *tip; /* The 'to' file's inode ptr */
 5  register struct filsys *fs;
 6
 7  char *old_u_dirp = u->u_dirp; /* Points to from filename */
 8
 9  /*
10   * Get pointer to 'from' file's inode.
11   */
12  if (fip = namei(uchar, 0)) == NULL )
13  return;
14
15
16  if ( fip->l_nlink >= 127 ) {
17  seterror(EMLINK); /* too many links */
18  goto end_replacefile;
19
20  }
21  if ( (fip->i_mode & IFMT) == IFDIR && !suser( ) ) {
22  /* File is a directory & requestor isn't superuser */
23  seterror(EISDIR);
24  goto end_replacefile;
25  }
26
27  /*
28   * unlock to avoid possibly hanging the namei (if 'to' == 'from')
29   */
30  fip->i_flag &=  ILOCK;
31
32  u->u_dirp = u->u_arg[1]; /* Tell namei to look for the 'to' file */
33
34  /*
35   * get inode ptr of 'to' file if it exists
36   * If tip != 0, file exists & tip points to locked inode.
37   *
38   * For any tip: u_pdir points to locked directory inode.
39   *
40   * NOTE: This uses a special namei() mode (3) created
        for this purpose
41   */
42  tip = namei(&uchar, 3);
43
44  if ( u->u_error )
45  goto end_replacefile; /* namei() encountered an error */
46
47  /*
48   * Make sure that the 'from' and 'to' files are on the same device.
49   */
50
51  if ( u->u_pdir->i_dev != fip->i_dev ) {
52  iput(u->u_pdir); /* Not on same device error */
53  seterror(EXDEV);
54  goto end_replacefile;
55  }
56
57  /*
58   * Write the directory entry using the 'to' filename and the 'from'
59   *inode number.
60   * NOTE: wdir() uses parameters obtained as a side effect to the
61   * last namei( ) call to determine which directory entry to
62   * update. It uses the inode number from the inode pointed
```

```
-continued
63  * by the call parameter.
64  */
65
66  wdir(fip); /* wdir unlocks dir inode */
67
68  /*
69   * i__nlink is incremented so that we can use unlink( ) to get rid of
70   * the 'from' 157 file's directory entry.
71   */
72  fip->i__link++; /* One more dir entries now point to this inode. */
73  fip->i__flag |=IUPD; /* Mark inode altered so it will be written
        to disk */
74  iput(fip); /* Release the from inode. */
75
76  if( tip ) {
77  /*
78   * Remove the 'to' file's inode if the 'to' file was it's only
79   * link.
80   */
81  tip->i__nlink--;
82  iput(tip);
83  }
84
85  /*
86   * Done changing name of 'from' file to 'to' file.
87   *
88   * Now clear directory entry of 'from' file.
89   */
90
91  u->u__dirp = old__u__dirp; /* points to from file again. */
92  unlink( );
93  return;
94
95  end__replacefile:
96  iput(fip); /* Release from file & update if necessary. */
97  }
```

We claim:

1. In a data processing system storing a first and a second version of a given data set, a method for synchronizing the first and second versions, comprising:
 maintaining a sync-complete control field and a sync-in-progress control field corresponding to each of the first and second versions, the sync-complete control field indicating when set that the corresponding version is synchronized and the sync-in-progress control field indicating when set that the corresponding version is in the process of being synchronized;
 clearing the sync-complete control field and the sync-in-progress control field in response to a change in the corresponding version;
 first detecting the sync-complete control field for the first and second versions, and if either or both are cleared, then setting the sync-in-progress control field corresponding to a selected version of the first and second versions;
 transferring a copy of the selected version to a temporary file to establish a temporary version;
 second detecting the sync-in-progress control field in the selected version, and if it is set when the temporary version is complete, then setting the sync-complete control field and clearing the sync-in-progress control field corresponding to the selected version;
 setting the sync-complete control field in the temporary version;
 renaming the temporary version to the one of the first and second versions not selected in the first detecting step and removing the one not selected in the first detecting step.

2. The method of claim 1, wherein the data processing system includes a first storage subsystem storing the first version and a second storage subsystem storing the second version.

3. The method of claim 2, wherein the temporary version is stored in the same storage subsystem as the version not selected in the first detecting step.

4. The method of claim 1, wherein the first and second versions are stored in a tree-structured file system, including at least one index node corresponding to each of the first version, the second version and the temporary version, and the sync-complete control field and the sync-in-progress control field are maintained in index nodes for corresponding files.

5. The method of claim 1, wherein the first detecting step is uninterruptible.

6. The method of claim 1, wherein the step of renaming the temporary version to the one of the first and second versions not selected in the first detecting step and removing the one not selected in the first detecting step is uninterruptible.

7. The method of claim 1, wherein during the second detecting step the sync-complete field is set and the sync-in-progress control field is cleared essentially simultaneously.

8. The method of claim 1, further including during the second detecting step if the sync-in-progress control field is clear when the temporary version is complete then removing the temporary version.

9. In a data processing system including a first processing unit storing a first version of a pre-specified plurality of data sets, a second processing unit storing a second version of the pre-specified plurality of data sets, and a facility for transferring data sets between the first and second processing units, a method for synchronizing the first and second versions of the pre-specified plurality of data sets, comprising:

maintaining a sync-complete control field and a sync-in-progress control field corresponding to each of the first and second versions of each data set in the pre-specified plurality, the sync-complete control field indicating when set that the corresponding version is synchronized and the sync-in-progress control field indicating when set that the corresponding version is in the process of being synchronized;

clearing the sync-complete control field and the sync-in-progress control field in response to a change in the corresponding version;

first detecting the sync-complete control field for the first and second versions of the data sets, and if either or both are cleared, then setting the sync-in-progress control field corresponding to a selected version of the first and second versions;

transferring a copy of the selected version to a temporary file to establish a temporary version;

second detecting the sync-in-progress control field in the selected version, and if it is set when the temporary version is complete, then setting the sync-complete control field and clearing the sync-in-progress control field corresponding to the selected version;

setting the sync-complete control field in the temporary version; and renaming the temporary version to the one of the first and second versions not selected in the first detecting step, and removing the one not selected in the first detecting step.

10. The method of claim 9, wherein the data processing system includes a first storage subsystem storing the first version and a second storage subsystem storing the second version.

11. The method of claim 10, wherein the temporary version is stored in the same storage subsystem as the version not selected in the first detecting step.

12. The method of claim 9, wherein the first and second versions are stored in a tree-structured filing system, including at least one index node corresponding to each of the first version, the second version and the temporary version, and the sync-complete control field and the sync-in-progress control field are maintained in index nodes for corresponding files.

13. The method of claim 9, wherein the first detecting step is uninterruptible.

14. The method of claim 9, wherein the step of renaming the temporary version to the one of the first and second versions not selected in the first detecting step and removing the one not selected in the first detecting step is uninterruptable.

15. The method of claim 9, wherein during the second detecting step the sync-complete control field is set and the sync-in-progress control field is cleared essentially simultaneously.

16. The method of claim 9, further including during the second detecting step if the sync-in-progress control field is clear when the temporary version is complete, then removing the temporary version.

17. The method of claim 9, further including:

maintaining a set of bulletins indicating accesses by the first processing unit to the first version and by the second processing unit to the second version;

reviewing the bulletins to identify a set of data sets for which the first or second versions have been accessed;

and wherein the first detecting step is carried out only over the identified set.

18. In a data processing system storing a first version of a pre-specified plurality of data sets and storing a second version of the pre-sepcified plurality of data sets, an apparatus for synchronizing the first and second versions of the pre-specified plurality of data sets, comprising:

processing means, associated with each of the first and second versions for reading and writing the versions of the pre-specified data sets, including means for storing an index node identifying the version with a sync-complete control field and a sync-in-progress control field, the sync-complete control field indicating when set that the identified version is synchronized and the sync-in-progress control field indicating when set that the identified version is in the process of being synchronized;

means for clearing the sync-complete control field and the sync-in-progress control field in a given index node in response to a write to the version identified by the given index node; and synchronizing means, in communication with the processing means, for synchronizing the first and second versions, including first means for detecting the sync-complete control field for the first and second versions, and if either or both are cleared, then setting the sync-in-progress control field in the index node identifying a selected version of the first and second versions;

means for transferring a copy of the selected version to a temporary file to establish a temporary version;

second means for detecting the sync-in-progress control field for the selected version, and if it is set when the temporary version is complete, then setting the sync-complete control field and clearing the sync-in-progress control field in the index node identifying the selected version;

means for setting the sync-complete control field in the temporary version; and means for updating the index node for the temporary version to rename the temporary version to the name of the one of the first and second versions not selected by the first means for detecting and removing the version not selected.

19. The apparatus of claim 18, wherein the data processing system includes a first storage subsystem storing the first version and a second storage subsystem storing the second version.

20. The apparatus of claim 19, wherein the temporary version is stored in the same storage subsystem as the version not selected by the first means for detecting.

21. The apparatus of claim 18, wherein the first means for detecting is uninterruptible.

22. The apparatus of claim 18, wherein the means for updating the index node for the temporary version to rename the temporary version to the name of the one of the first and second versions not selected by the first means for detecting and removing the version not selected is uninterruptible.

23. The apparatus of claim 18, wherein the second means for detecting sets the sync-complete control field and clears the sync-in-progress control field essentially simultaneously.

24. The apparatus of claim 18, wherein the second means for detecting further includes means, if the sync-in-progress control field is clear when the temporary version is complete, for removing the temporary version.

25. The apparatus of claim 18, wherein:
the processing means further includes means for maintaining a bulletin indicating writes by the first processing unit to the first version and by the second processing unit to the second version; and
the synchronizing means further includes means for reviewing the bulletins to identify a set of data sets for which the first or second versions have been subject of writes; and
the first means for detecting is responsive to the identified set.

* * * * *